United States Patent
Zhang et al.

(10) Patent No.: US 11,061,611 B2
(45) Date of Patent: Jul. 13, 2021

(54) DYNAMICALLY ALTERED DATA DISTRIBUTION WORKLOAD ON A STORAGE SYSTEM

(71) Applicant: International Business Machines Corporation, Armonk, NY (US)

(72) Inventors: Da Lei Zhang, Shanghai (CN); Jia Jun Lu, Shanghai (CN); Li Li Gu, Shanghai (CN); Le Yi Zhou, Shanghai (CN); Xiao Yu Wang, Shanghai (CN); Wen Bao Yin, Shanghai (CN)

(73) Assignee: International Business Machines Corporation, Armonk, NY (US)

(*) Notice: Subject to any disclaimer, the term of this patent is extended or adjusted under 35 U.S.C. 154(b) by 218 days.

(21) Appl. No.: 16/281,531

(22) Filed: Feb. 21, 2019

(65) Prior Publication Data
US 2020/0272356 A1    Aug. 27, 2020

(51) Int. Cl.
    *G06F 3/06* (2006.01)
(52) U.S. Cl.
    CPC .......... *G06F 3/0659* (2013.01); *G06F 3/0604* (2013.01); *G06F 3/067* (2013.01)
(58) Field of Classification Search
    CPC ...... G06F 3/0604; G06F 3/061; G06F 3/0635; G06F 3/0659; G06F 3/067
    See application file for complete search history.

(56) References Cited

U.S. PATENT DOCUMENTS

| | | | |
|---|---|---|---|
| 7,539,754 B2 | 5/2009 | Chambliss et al. | |
| 8,996,808 B2 | 3/2015 | Hyde, II et al. | |
| 9,037,548 B1 | 5/2015 | Dolan et al. | |
| 9,372,637 B1 | 6/2016 | Alatorre et al. | |
| 9,507,887 B1 * | 11/2016 | Wang | G06F 3/0685 |
| 9,569,136 B2 | 2/2017 | Fang et al. | |
| 10,521,124 B1 * | 12/2019 | Aharoni | G06F 3/0631 |
| 2017/0269854 A1 | 9/2017 | Dimnaku et al. | |
| 2018/0314427 A1 * | 11/2018 | Dalmatov | G06F 3/0644 |
| 2019/0196969 A1 * | 6/2019 | Yang | G06F 3/0685 |

FOREIGN PATENT DOCUMENTS

EP    2156281 A1    2/2010

OTHER PUBLICATIONS

Mell et al., "The NIST Definition of Cloud Computing: Recommendations of the National Institute of Standards and Technology," Special Publication 800-145, Sep. 2011, 7 pages, National Institute of Standards and Technology, Gaithersburg, MD.

* cited by examiner

*Primary Examiner* — Aracelis Ruiz
(74) *Attorney, Agent, or Firm* — Jorge R. Maranto

(57) ABSTRACT

A method and a system for creating a workload distribution plan on a storage system. The method includes, for each storage location, initializing components for at least one data type, such that the components establish a baseline distribution percentage. The method also includes writing data packages onto the storage system over a predetermined time period. The method also includes, for each data type on each storage location, creating a workload distribution plan, where the workload distribution plan distributes a workload of the storage system to the storage location. The method also includes implementing the workload distribution plan on the storage system.

17 Claims, 6 Drawing Sheets

DYNAMICALLY ALTERED DATA DISTRIBUTION WORKLOAD ON A STORAGE SYSTEM

BACKGROUND

The present disclosure relates to data storage, and more specifically, to alter a data storage workload on a storage system.

Storing data on a storage solution is a routine and common operation. However, technological advances in storage solutions have created vast amounts of variation in storage technology. In addition, there are several different types of data, such as structured data, non-structured data, and semi-structured data. These variations in storage solutions and data types contribute to the challenging task of attempting to store data in an efficient and productive manner.

SUMMARY

Various embodiments are directed to a method for distributing workloads on a storage system. The method includes, for each storage location, initializing components for at least one data type, such that the components establish a baseline distribution percentage. The method also includes writing data packages onto the storage system over a predetermined time period. The method can also include, for each data type on each storage location, creating a workload distribution plan, where the workload distribution plan distributes a workload of the storage system to the storage location. The method can also include implementing the workload distribution plan on the storage system.

Further embodiments are directed to a computer program product for distributing workloads on a storage system, which can include a computer readable medium having program instructions embodied therewith, the program instructions executable by a processor to cause the device to perform operations. The operations include, for each storage location, initializing components for at least one data type, such that the components establish a baseline distribution percentage. The operations also include writing data packages onto the storage system over a predetermined time period. The operations can also include, for each data type on each storage location, creating a workload distribution plan, where the workload distribution plan distributes a workload of the storage system to the storage location. The operations can also include implementing the workload distribution plan on the storage system.

Additional embodiments are directed to a system, which can include at least one processing component and at least one memory component. The memory component is configured to store instruction, which when executed from the memory, cause the processing component to perform operations on the system. The operations include, for each storage location, initializing components for at least one data type, such that the components establish a baseline distribution percentage. The operations also include writing data packages onto the storage system over a predetermined time period. The operations can also include, for each data type on each storage location, creating a workload distribution plan, where the workload distribution plan distributes a workload of the storage system to the storage location. The operations can also include implementing the workload distribution plan on the storage system.

BRIEF DESCRIPTION OF THE DRAWINGS

These and other features, aspects, and advantages of the embodiments of the disclosure will become better understood with regard to the following description, appended claims, and accompanying drawings where:

Figure 1:
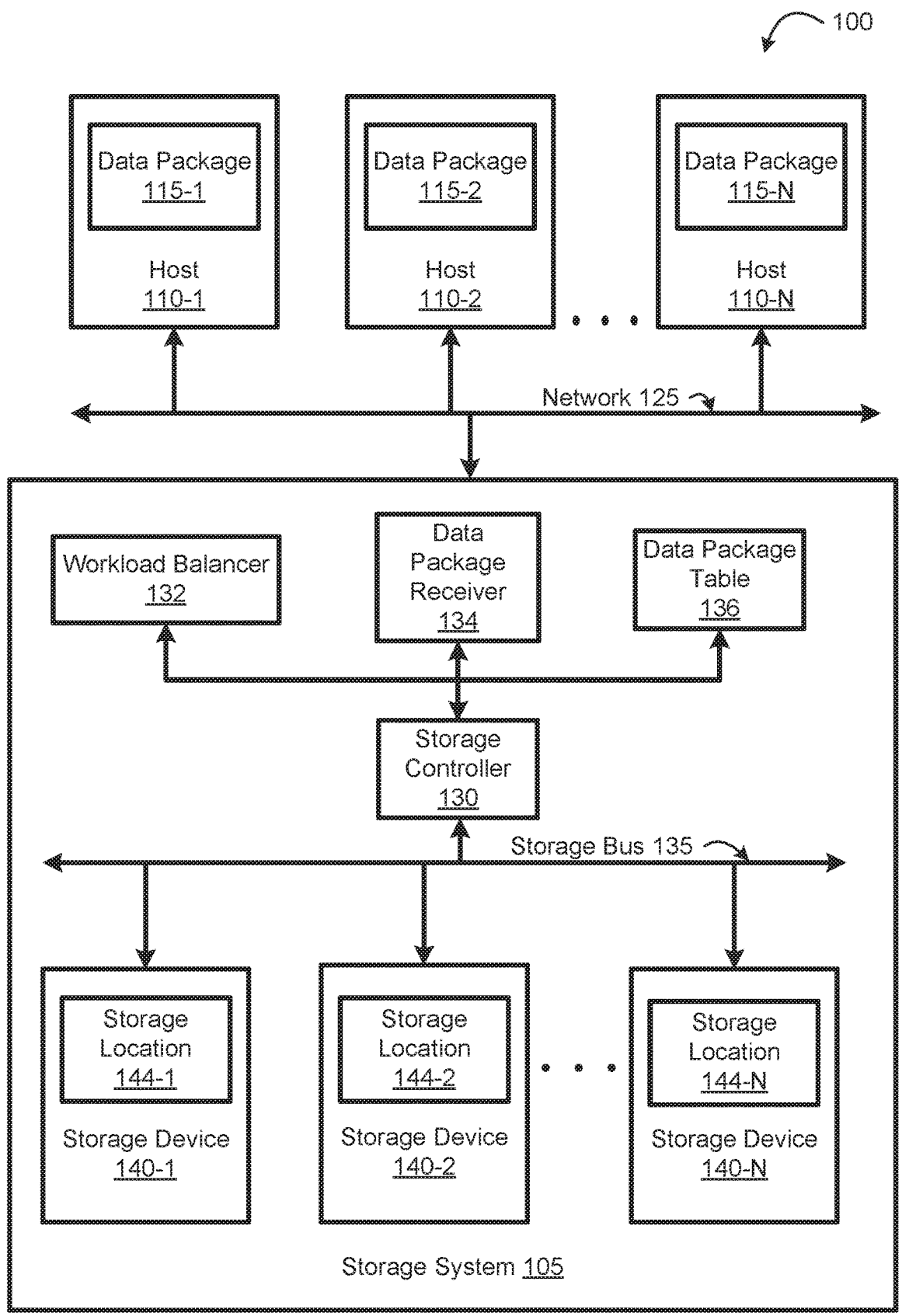
FIG. 1 is a diagram of a tiered overview of a storage system that connects multiple hosts to multiple storage devices, according to embodiments of the present disclosure.

While the disclosure is amenable to various modifications and alternative forms, specifics thereof have been shown by way of example in the drawings and will be described in detail. It should be understood, however, that the intention is not to limit the particular embodiments described. On the contrary, the intention is to cover all modifications, equivalents, and alternatives falling within the scope of the disclosure Like reference numerals are used to designate like parts in the accompanying drawings.

DETAILED DESCRIPTION

Efficient data distribution across a storage solution is becoming increasingly difficult, at least in part, due to the evolution and complexity of a wide array of storage solutions. A storage area network (SAN), as one type of storage solution, can comprise of numerous storage devices connected in a variety of different ways. These variables affect the efficiency of the overall system which can make managing data difficult. A storage administrator, tasked with managing a storage solution, may rely on numerous factors (e.g., device type, transfer speed, and connectivity) when attempting to formulate an adequate workload distribution plan. Other factors can include, the speed of the storage device, the needs of the host, the type of data stored, as well as numerous others.

Another factor to take into consideration is the type of data that is stored. Different data types can perform better on certain storage devices. For example, a structured data type typically performs better on a storage device with a high TOPS (input/output operations per second) performance measurement such as a solid-state drive (SSD) array.

Managing and evaluating the numerous factors can assist in determining where to store data. However, these factors can continuously change as more and more data becomes stored making the job of the storage administrator increasingly more difficult and time consuming. This can result in costly inefficiency and basic errors to be committed.

Embodiments of the disclosure refer to structured data, unstructured data, and semi-structured data. As used herein, "structured" data refers to data that is organized in a predetermined arrangement. For example, structured data can be data that is stored in a database. Structured data is typically comprised of data whose patterns make them easily searchable. For example, data, organized in fields of a relational or an object-oriented database, is considered structured data. Each table in the database has predefined columns or fields that specify the type of data stored, which in part, allows the data to be easily searched.

As used herein, "unstructured" data refers to data that does not have readily discernible organization. For example, data such as audio, video, and text documents. Most data can typically be considered unstructured. As used herein, "semi-structured" data refers to data with some organizational properties that can make it easier to analyze. For example, semi-structured data can be documents with extensible markup language (XML) or documents with JavaScript Objection Notation (JSON) tags. Also, NoSQL databases can also be considered as semi-structured data. A semi-structured document may have text associated with a field, but the amount of text may vary because the field does not specify limitations.

Disclosed herein are a method and system for optimizing a data storage workload for different data types on a storage system. Examples of data types include structured data, non-structured data, and semi-structured data. However, data can be divided into various other data types depending on the needs of a system or host. The system receives a workload of data comprising of varying data types that provide information on the performance of each available storage location in the system. Therefore, the workload distribution can be adapted based on the information gained from the workload of data already received. Over a given time period, the workload distribution can be continuously updated as data is received. This increases the efficiency and performance of each storage location, which in turn, leads to a well-maintained storage system.

FIG. 1 is a block diagram illustrating a system 100, according to one embodiment of the present disclosure. The system 100 includes, but is not limited to, one or more hosts 110-1, 110-2, 110-N (collectively "host 110") with data packages 115-1, 115-2, 115-N (collectively "data package 115"), a network 125, and a storage system 105. The host is communicatively coupled to the storage system 105 over the network 125. The storage system 105 includes a storage controller 130, a storage bus 135, and one or more storage devices 140-1, 140-2, 140-N (collectively "storage device 140"). The storage controller is communicatively coupled with the storage device 140 over the storage bus 135. In some embodiments, the storage system 105 includes a workload balancer 132, a data package receiver 134, and a data package table 136. In some embodiments, the storage devices 140 includes a storage location 144-1, 144-2, and 144-N (collectively "storage location 144").

The storage system 105 is a component of system 100 configured to consolidate, manage, and operate data storage. In some embodiments, the storage system 105 is a server or an aggregation of servers. Examples of the storage system 105 include storage servers (e.g., block-based storage), direct attached storage, file servers, server-attached storage, network-attached storage, or any other storage solution. In some embodiments, the components of the storage system 105 are implemented within a single device. In some other embodiments, the components of the storage system 105 comprise of a distributed architecture. For example, the storage system 105 can comprise of multiple storage devices 140 that are physically located at different locations but are able to communicate over a communication network to achieve a desired result.

The host 110 is a component of system 100 configured to provide data packages 115 and commands to the storage system 105. In some embodiments, the host 110 is a server (e.g., Windows, Power Systems, IBM I, UNIX, and System Z), a personal computer (e.g., desktop, laptop, and tablet), or any device capable of communicating over a network. The data packages 115 can be manipulated in a variety of ways such as reading, writing, deleting, and moving the data packages 115. To accomplish this, commands are sent by the host 110 to the storage system via SCSI commands, in some embodiments. In some embodiments, the host 110 provides a data type tag within the data package 115 that provides the storage system 105 with information detailing the data type of the data package 115. For example, the host 115 can indicate whether the data package 115 is structured, unstructured, or semi-structured data.

The network 125 is a component of system 100 configured to facilitate direct, high-speed data transfers and communication between the host 110 and the storage system 105. In some embodiments, the network 125 is an internal bus. In some other embodiments, the network 125 is an external bus. Examples of the network 125 include a local area network (LAN), a wide area network (WAN), a storage area network (SAN), intranet, or any combination thereof.

The storage controller 130 is a component of storage system 105 configured to manage the input and output of data from the network 125 to the storage device 140. Data can be stored and manipulated depending on the needs of the system. In some embodiments, the storage controller arranges and configures the storage devices 140 in a redundant array of independent disks (RAID) configuration. For example, data stored within the storage system 105 can be striped across all configured storage devices 140. Various RAID configurations also offer techniques such as striping, mirroring, and providing parity bits of data. The storage controller 130 is also configured to manage how the data, received by the storage system 105, is stored and retrieved. For example, in tier-based storage configurations, data is placed in storage devices 140 best suited for the type of data that is received.

The workload balancer 132 is a component of storage system 105 configured to distribute the data received by the storage system 105 across each storage location 144. While shown as a separate component in FIG. 1, it should be understood that the workload balancer 132 may be arranged as part of the storage controller 130 or any other suitable component of the storage system 105, in some embodiments. In some embodiments, the workload balancer 132 rebalances the workload distribution after a given time period. For example, data can be distributed for a minute. After the minute has occurred, the workload balancer can evaluate the efficiency of the storage system 105 and rebalance the distribution every minute. Depending on the needs of the system, the balancing can occur after any predetermined time period, upon request by an administrator, or whenever the workload balancer 132 deems necessary.

In some embodiments, the workload balancer 132 updates the data package table 136 with information regarding where the data is stored. For example, the workload balancer 132 can distribute the data package 115 to the storage location 144 stored within the storage device 140-1. The workload balancer 132 can update the data package table 136 with that information.

The data package receiver 134 is a component of storage system 105 configured to receive data packages 115 sent to the storage system 105 and updates the data package table 136 with information pertaining to each data package 115. While shown as a separate component in FIG. 1, it should be understood that the data package receiver 134 may be arranged as part of the storage controller 130 or any other suitable component of the storage system 105 in some embodiments. In some embodiments, the data packager receiver 134 removes the data type indications from the data package 115. For example, a data package 115 can be received that contains a marker indicating that the data being received is structured data. The data package receiver 134 can remove the marker so that only the actual data is stored on the storage system 105. In some embodiments, the data package receiver 134 evaluates the data package 115 and determines the data type being received.

The data package table 136 is a component of storage system 105 configured to store information on the data packages 115 received by the storage system 105. While shown in FIG. 1 as a table, the data package table 136 can be a table, a database, a journal, or metadata. The data package table 136 can include information that provides access to the data stored on the storage system 105. In some embodiments, the data package table includes information on the size of the data, the location of the data, the data type of the data, and the write speed of the storage location when it was written into storage.

The storage bus 135 is a component of storage system 105 configured to facilitate direct, high-speed transfer and communication between the storage devices 140, either directly or through the storage controller 130. In some embodiments, the storage bus 135 is an internal bus. In some other embodiments, the storage bus 135 is an external bus. In some embodiments, the storage bus 135 enables data to be moved without server intervention, therefore freeing up processing cycles on the server end. For example, a disk device can back up its data to a tape device as needed without receiving a command from a server or controller. Examples of the storage bus 135 include a LAN, a WAN, a Fibre Channel (FC), and any combination thereof. In some embodiments, implementations interconnect together into many network configurations capable of communicating over long distances. The storage bus 135 is configured to transfer data utilizing a variety of standards. Some standards include the Small Computer System Interface (SCSI), Fibre Channel, fiber connection (FICON), and Internet Protocol (IP) standards.

The storage device 140 is a component of storage system 105 configured to store and manage the input and output of data on the storage system 105. This configuration can assist with the integration of the device 140 with other such devices. Examples of storage devices 140 include tape systems (e.g., tape drives, tape autoloaders, tape libraries), disk systems, storage arrays, magnetic drives, solid-state drives, and optical drives. In some embodiments, the storage devices 140 includes at least one storage location 144. A storage location 144 is a component of the storage location 140 configured to be a logical unit of physical storage. Examples of storage locations include RAID arrays from internal storage or volumes from external storage. A storage location 144 can consist of multiple physical disks that are presented as a single logical disk to the network 125 and host 110.

Figure 2:
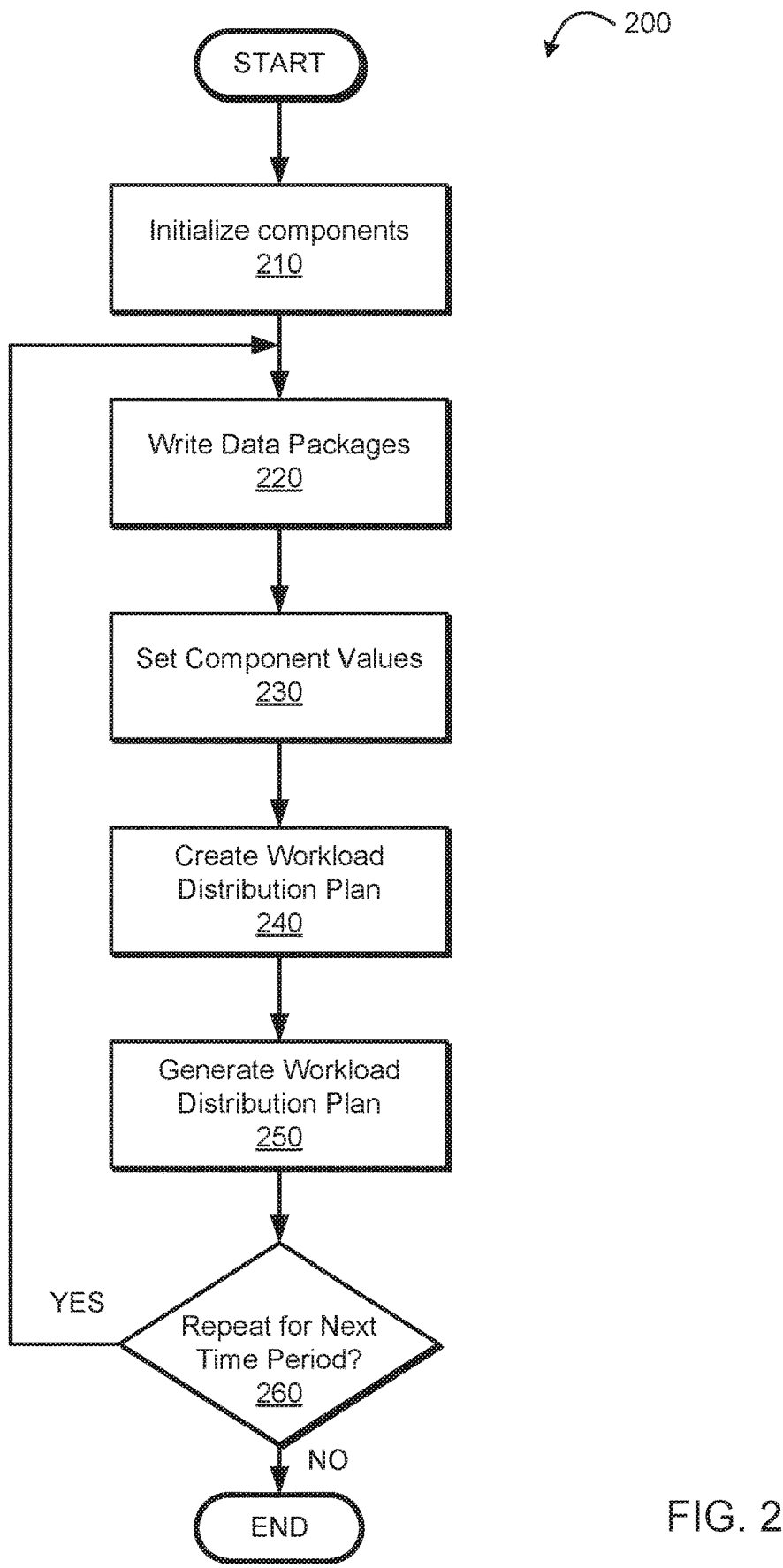
FIG. 2 is a flow diagram illustrating a process of balancing a workload for a storage system, according to embodiments of the present disclosure.

FIG. 2 is a flow diagram illustrating a process 200 of balancing a workload for a storage system, according to some embodiments of the present disclosure. To illustrate process 200, but not to limit embodiments, FIG. 2 is described within the context of system 100 of FIG. 1. Where elements described with respect to FIG. 2 are identical to elements shown in FIG. 1, the same reference numbers are used in both Figures.

The process 200 initializes the components required to balance the workload on the storage system 105. This is illustrated at step 210. In some embodiments, the components establish the initial workload distribution plan for the storage system 105. For example, the initial workload distribution plan can be set such that each storage location 144 available in the storage system 105 is given an equal distribution of workload over a given time period. For instance, a storage system 105 can have three available storage locations 144. Each storage location 144 can be given 33% of the workload. The initial workload distribution plan can then operate and store data for a predetermined time period. In some embodiments, a time period is set to allow process 200 to generate another workload distribution plan around the data received during the time period. For example, a time period of one minute can be set such that the process 200 generates another workload distribution plan based around the data that was received during that minute. Other time periods can be used such as an hour, a day, or any other time that an administrator or operator deems adequate.

In some embodiments, step 210 only prepares the process 200 to allow for the creation of the initial workload distribution plan. For example, the process 200 is initialized such that the initial workload distribution plan is created in the same way as a workload distribution plan.

Once initialized, the data package receiver 134 writes data packages 115 received over a given time period to the storage system 105. This is illustrated at step 220. In some embodiments, the data package receiver 134 updates the data package table 136 with the data type of the data package 115, writes the data to a storage location 144 based on the workload distribution plan, updates the data package table 136 with the write speed that was achieved while writing to the storage location 144, and writes the location of the storage location 144. In some embodiments, the speed of the write command is calculated by the destage speed of the storage controller 130. The destage speed is the speed the data package receiver 134 writes new or updated data from a cache or nonvolatile storage to a storage location 144. In some embodiments, the storage controller 130 records the time when the data package is received, and then records the time when the cache is empty which signifies that the entire data package 115 has been written to a storage location 144.

The process 200 proceeds by having the storage controller 130 set the component values used to create the workload distribution plan. This is illustrated at step 230. The values can be set in such a way to allow the workload distribution plan to be determined for the upcoming time period. In some embodiments, for each data type stored on each storage location 144, the write speed is set. Also, for each data type, the average write speed is set. By setting the write speed of each data type and by setting the average speed of each data, the storage controller 130 provides step 240 those values for utilization in creating a workload distribution plan. based upon, at least in part, those values.

The workload balancer 132 proceeds in creating the workload distribution plan. This is illustrated at step 240. The workload distribution plan provides a distribution of a storage storing workload for the storage locations 144 stored on the storage system 105. Each available storage location 144 may be given a percentage of the workload based on factors determined by the workload balancer 132. In one embodiment, the workload balancer 132 distributes the workload based on the write speed of the storage location 144 for a given data type. In some embodiments, the workload balancer 132 distributes the workload based on how frequently the storage location 144 is used as storage. Multiple factors can be utilized in determining an efficient workload distribution plan including write speed, storage location 144 utilization, average data type speed, and multiple others.

The workload balancer 132 proceeds by generating the workload distribution plan. This is illustrated at step 250. The workload distribution plan is generated by allocating a percentage of data to each available storage location 144. In one embodiment, the data is allocated using equation (1) as shown:

$$A(i) = \frac{bal(x(i))}{(bal(x(1)) + bal(x(2)) + \ldots + bal(x(C)))} \times C \quad \text{Equation 1}$$

The parameter A indicates that allocation allotted to a storage location i for a data type x. Where C indicates the total number of storage locations available to storage data type x in the storage system 105. The write speed bal of data type x, on storage location i, is divided by the summation of all the write speeds of data type x, on each storage location and multiplied by the total number of storage locations C to give the allocated quota for storage location i of data type x for an upcoming time period. Once the allocation is calculated, the workload balancer 132 can implement the allocation for each data type on each storage location 144 for the upcoming time period.

The storage controller 130 repeats the process steps 220-250 over for the upcoming time period until such a time when the workload balancing is no longer requested. This is illustrated at step 260. In some embodiments, the process will repeat for a predetermined time period. For example, the process can be set to run for a day, a week, a month, or for however long the operator wishes. In some embodiments, the process will continuously repeat during peak workload times. For example, a storage system 105 may receive copious amounts of data from 12:00-17:00 hours Monday through Friday so the process will only run and balance the storage workload during those peak times. Other time periods can be used and can be dependent solely at the discretion of an administrator.

Figure 3:
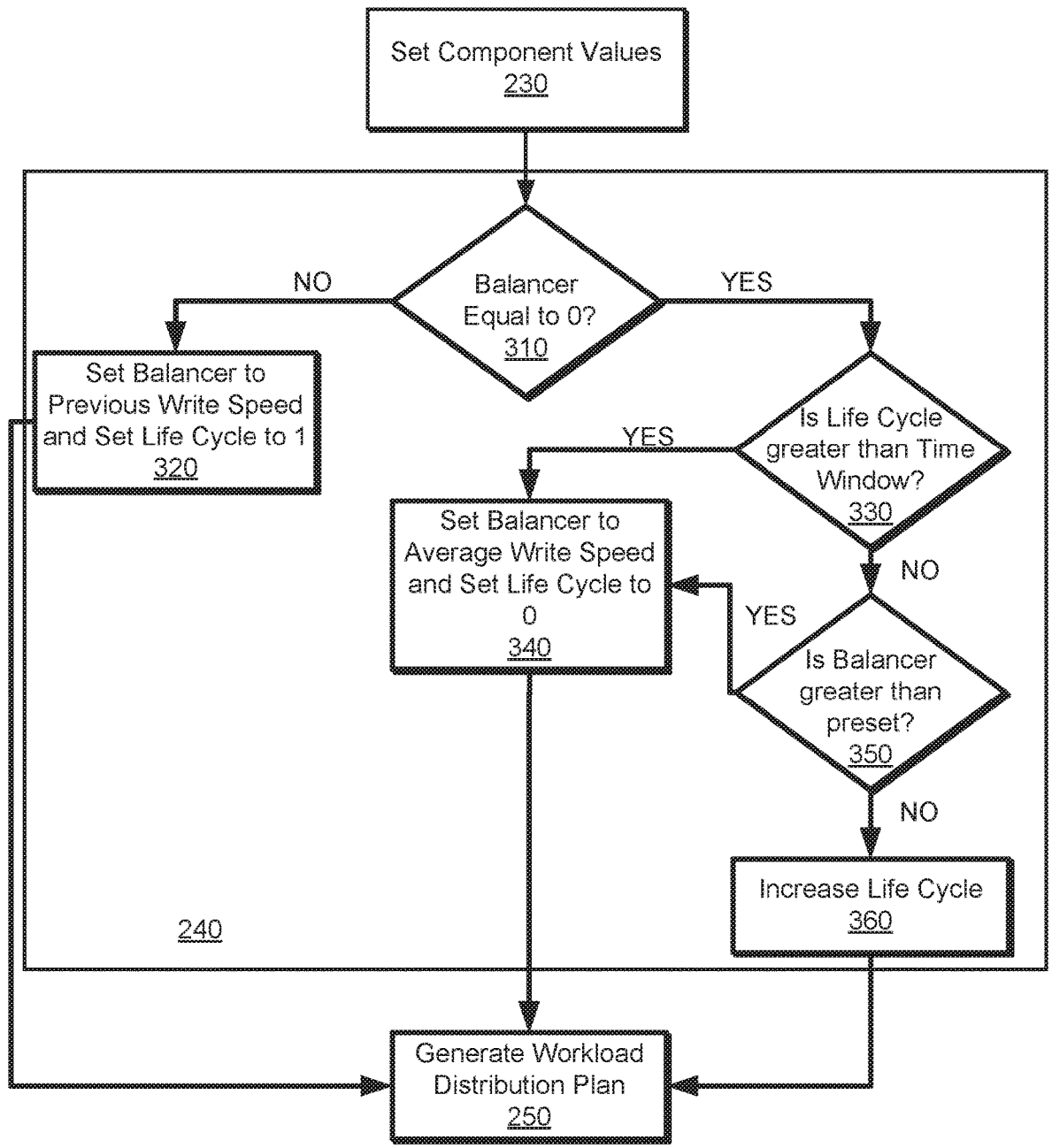
FIG. 3 is a flow diagram illustrating a process of creating a workload distribution plan, according to embodiments of the present disclosure.

FIG. 3 is a flow diagram illustrating process step 240 of FIG. 2 above, creating a workload distribution plan, of process 200, in greater detail according to some embodiments of the present disclosure. To illustrate process step 240, but not to limit embodiments, FIG. 3 is described within the context of system 100 of FIG. 1 and process 200 of FIG. 2. Where elements described with respect to FIG. 3 are identical to elements shown in FIG. 1 and FIG. 2, the same reference numbers are used in both Figures.

For each data type on each storage location 144, the workload balancer 132 determines whether the write speed is equal to 0. This is illustrated at step 310. In some embodiments, the write speed of a data type being equal to zero signifies that the particular storage location 144 did not write that particular data type over the predetermined time period. For example, if a time period is set one minute, and a storage location 144 has a write speed of zero after that minute has occurred, then that indicates that the storage controller 130 did not send data of that data type to that storage location 144 during the time period. However, if the write speed of a data type is not equal to zero, then the storage location 144 has written that data type over the time period. For example, if a storage location 144 has a recorded write speed of 32 MBps then that signifies the write speed for the data type over the time period.

If the workload balancer 132 determines that the write speed of a data type on a storage location 144 is not equal to zero, then a balancer component can be set to the previous write speed recorded. A life cycle count can also be set to 1. This is illustrated at step 320. A balancer component assists in determining the quota of data that is to be allocated for the storage location 144 for the next time period. For example, if a previously recorded write speed of a data type was 144 MBps, then the balancer component will be set to 144 MBps. A life cycle count is a count that is adjusted to assure that a storage location 144 is utilized within a given time window. A time window is a predetermined count that assists in distributing the workload to all available storage locations 144 in a storage system 105. The process 200 can then proceed to step 250 and generate a workload distribution plan based, in part, on the value of the balancer component.

If the workload balancer 132 determines that the write speed of a data type on a storage location 144 is equal to zero, the workload balancer 132 can determine whether the life cycle count is greater than the time window. This is illustrated at step 330. As discussed, if a write speed is equal to zero then the data type has not been written to the storage location 144 over the past time period. The life cycle count is checked to determine how many life cycles have occurred where the write speed is equal to zero and whether that number is greater than a predetermined time window. For example, if a time window is set to five, the workload balancer 132 can compare the life cycle count to the given time window.

If the workload balancer 132 determines that the life cycle count is greater than the time window, then the workload balancer 132 can then set the balancer component to the average write speed of the storage locations 144 on the storage system 105 for that particular data type. This is illustrated at step 340. For example, if the average write speed across all storage location 144 is 25 MBps, then the balancer component can then be set to 25 MBps. The life cycle count can then be reset back to zero. The process 200 can then proceed to step 250 and generate a workload distribution plan based, in part, on the value of the balancer component.

If the workload balancer 132 determines that the life cycle is not greater than the time window, then the workload balancer 132 can then determine whether the value of the balancer component is greater than a preset write speed. This is illustrated at step 350. For example, if the preset write speed is set to 20 MBps, then the workload balancer 132 can compare whether the balancer component is greater than the preset. If the workload balancer 132 determines that the balancer component is greater than the preset, the process 200 can then proceed to step 340.

If the workload balancer 132 determines that the balancer is not greater than the preset write speed, then the workload balancer increases the life cycle count. This is illustrated at step 360. In some embodiments, the life cycle count is increased by one. Any increment can be used and is dependent on how quickly the administrator would like the life cycle count to reach the preset time window. The process 200 can then proceed to step 250 and generate a workload distribution plan based, in part, on the value of the balancer component.

Figure 4:
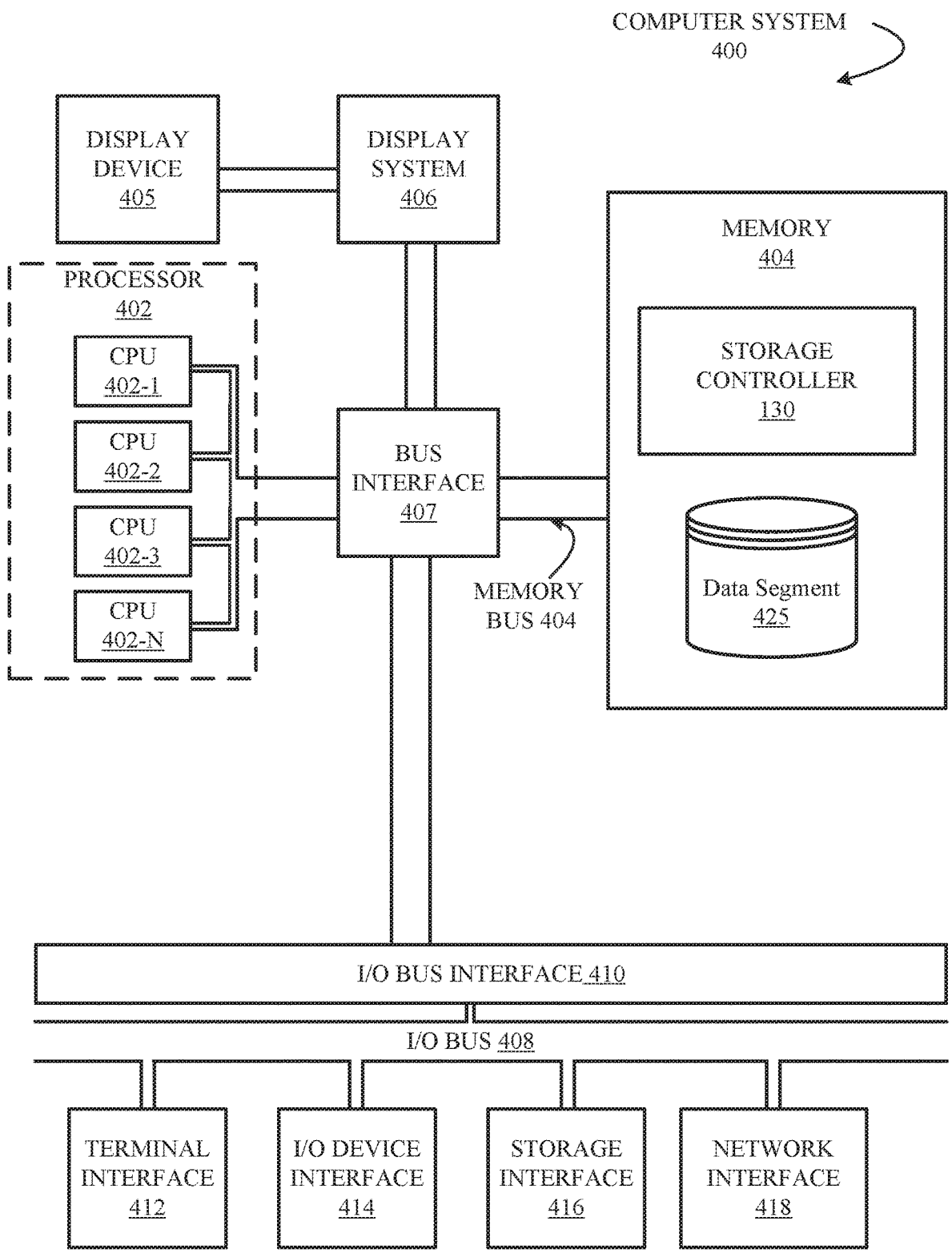
FIG. 4 is a block diagram illustrating a computer system, according to embodiments of the present disclosure.

FIG. 4 is a high-level block diagram illustrating an exemplary computer system 400 that can be used in implementing one or more of the methods, tools, components, and any related functions described herein (e.g., using one or more processor circuits or computer processors of the computer). In some embodiments, the major components of the computer system 400 comprise one or more processors 402, a memory subsystem 404, a terminal interface 412, a storage interface 416, an input/output device interface 414, and a network interface 418, all of which can be communicatively coupled, directly or indirectly, for inter-component communication via a memory bus 403, an input/output bus 408, bus interface unit 407, and an input/output bus interface unit 410.

The computer system 400 contains one or more general-purpose programmable central processing units (CPUs) 402-1, 402-2, and 402-N, herein collectively referred to as the CPU 402. In some embodiments, the computer system 400 contains multiple processors typical of a relatively large system; however, in other embodiments the computer system 400 can alternatively be a single CPU system. Each CPU 402 may execute instructions stored in the memory subsystem 404 and can include one or more levels of on-board cache.

The memory 404 can include a random-access semiconductor memory, storage device, or storage medium (either volatile or non-volatile) for storing or encoding data and programs. In some embodiments, the memory 404 represents the entire virtual memory of the computer system 400 and may also include the virtual memory of other computer systems coupled to the computer system 400 or connected via a network. The memory 404 is conceptually a single monolithic entity, but in other embodiments the memory 404 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory can be further distributed and associated with different CPUs or sets of CPUs, as is known in any of various so-called non-uniform memory access (NUMA) computer architectures. The memory 404 also contains a storage controller 130 and a data segment 425.

These components are illustrated as being included within the memory 404 in the computer system 400. However, in other embodiments, some or all of these components may be on different computer systems and may be accessed remotely, e.g., via a network. The computer system 400 may use virtual addressing mechanisms that allow the programs of the computer system 400 to behave as if they only have access to a large, single storage entity instead of access to multiple, smaller storage entities. Although these components are illustrated as being separate entities, in other embodiments some of these components, portions of some of these components, or all of these components may be packaged together.

In an embodiment, the storage controller 130 includes instructions that execute on the processor 402 or instructions that are interpreted by instructions that execute on the processor 402 to carry out the functions as further described in this disclosure. In another embodiment, the storage controller 130 is implemented in hardware via semiconductor devices, chips, logical gates, circuits, circuit cards, and/or other physical hardware devices in lieu of, or in addition to, a processor-based system. In another embodiment, the storage controller 130 includes data in addition to instructions.

Although the memory bus 403 is shown in FIG. 4 as a single bus structure providing a direct communication path among the CPUs 402, the memory subsystem 404, the display system 406, the bus interface 407, and the input/output bus interface 410, the memory bus 403 can, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the input/output bus interface 410 and the input/output bus 408 are shown as single respective units, the computer system 400 may, in some embodiments, contain multiple input/output bus interface units 410, multiple input/output buses 408, or both. Further, while multiple input/output interface units are shown, which separate the input/output bus 408 from various communications paths running to the various input/output devices, in other embodiments some or all of the input/output devices may be connected directly to one or more system input/output buses.

The computer system 400 may include a bus interface unit 407 to handle communications among the processor 402, the memory 404, a display system 406, and the input/output bus interface unit 410. The input/output bus interface unit 410 may be coupled with the input/output bus 408 for transferring data to and from the various input/output units. The input/output bus interface unit 410 communicates with multiple input/output interface units 412, 414, 416, and 418, which are also known as input/output processors (IOPs) or input/output adapters (IOAs), through the input/output bus 408. The display system 406 may include a display controller. The display controller may provide visual, audio, or both types of data to a display device 405. The display system 406 may be coupled with a display device 405, such as a standalone display screen, computer monitor, television, or a tablet or handheld device display. In alternate embodiments, one or more of the functions provided by the display system 406 may be on board a processor 402 integrated circuit. In addition, one or more of the functions provided by the bus interface unit 407 may be on board a processor 402 integrated circuit.

In some embodiments, the computer system 400 is a multi-user mainframe computer system, a single-user system, or a server computer or similar device that has little or no direct user interface but receives requests from other computer systems (clients). Further, in some embodiments, the computer system 400 is implemented as a desktop computer, portable computer, laptop or notebook computer, tablet computer, pocket computer, telephone, smart phone, network switches or routers, or any other appropriate type of electronic device.

It is noted that FIG. 4 is intended to depict the representative major components of an exemplary computer system 400. In some embodiments, however, individual components may have greater or lesser complexity than as represented in FIG. 4, Components other than or in addition to those shown in FIG. 4 may be present, and the number, type, and configuration of such components may vary.

In some embodiments, the data storage workload balancing processes described herein could be implemented in a cloud computing environment, which is described below with respect to FIGS. 5 and 6. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
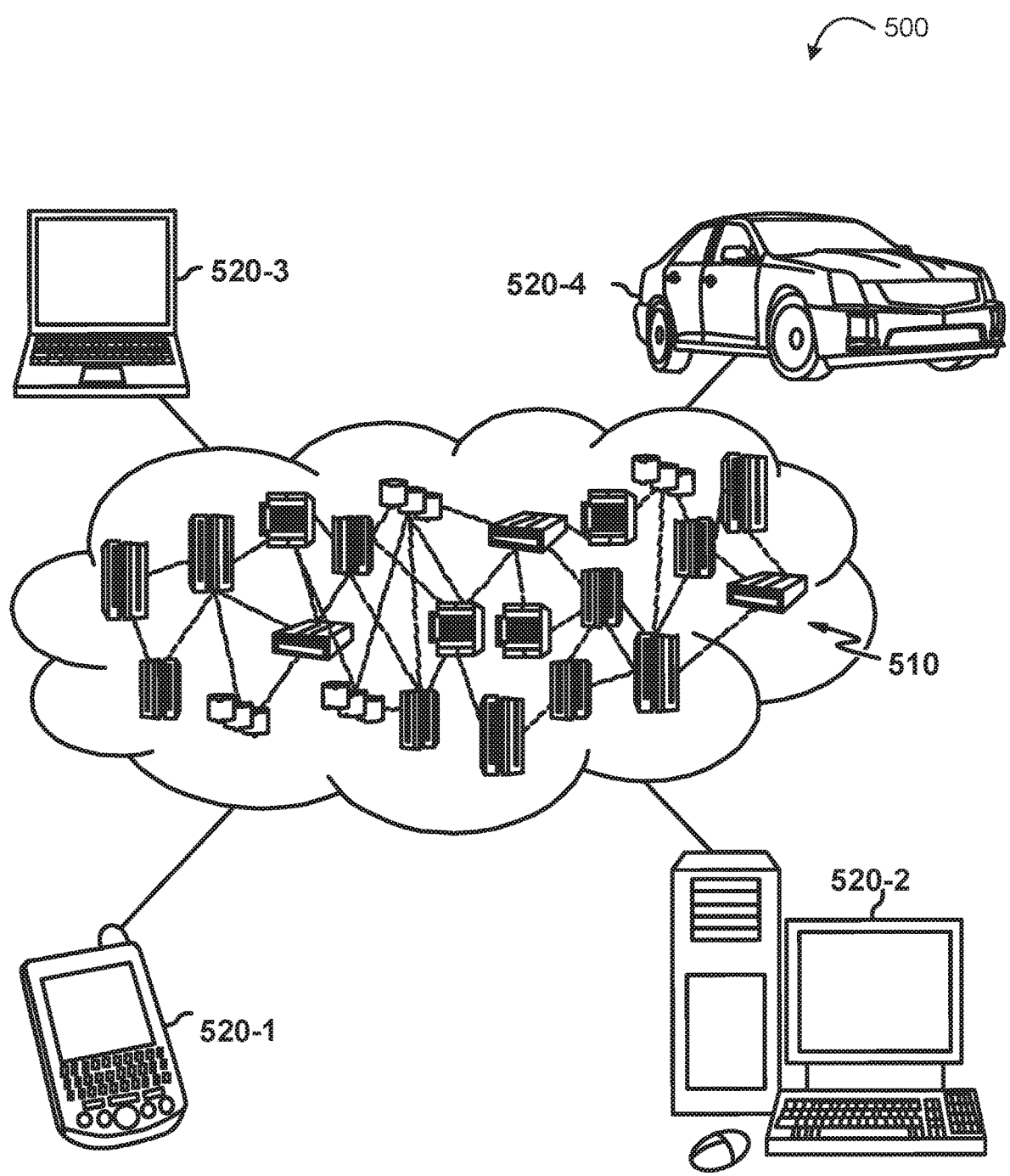
FIG. 5 is a block diagram illustrating a cloud computing environment, according to some embodiments of the present disclosure.

FIG. 5 is a block diagram illustrating a cloud computing environment 500, according to some embodiments of the present disclosure. As shown, cloud computing environment 500 includes one or more cloud computing nodes 510 with which local computing devices used by cloud consumers, such as, for example, personal digital assistant (PDA) or cellular telephone 520-1, desktop computer 520-2, laptop computer 520-3, and/or automobile computer system 520-4 may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 520-1-520-4 shown in FIG. 5 are intended to be illustrative only and that computing nodes 510 and cloud computing environment 500 can communicate with any type of computerized device over any type of network and/or network addressable connection (e.g., using a web browser).

Figure 6:
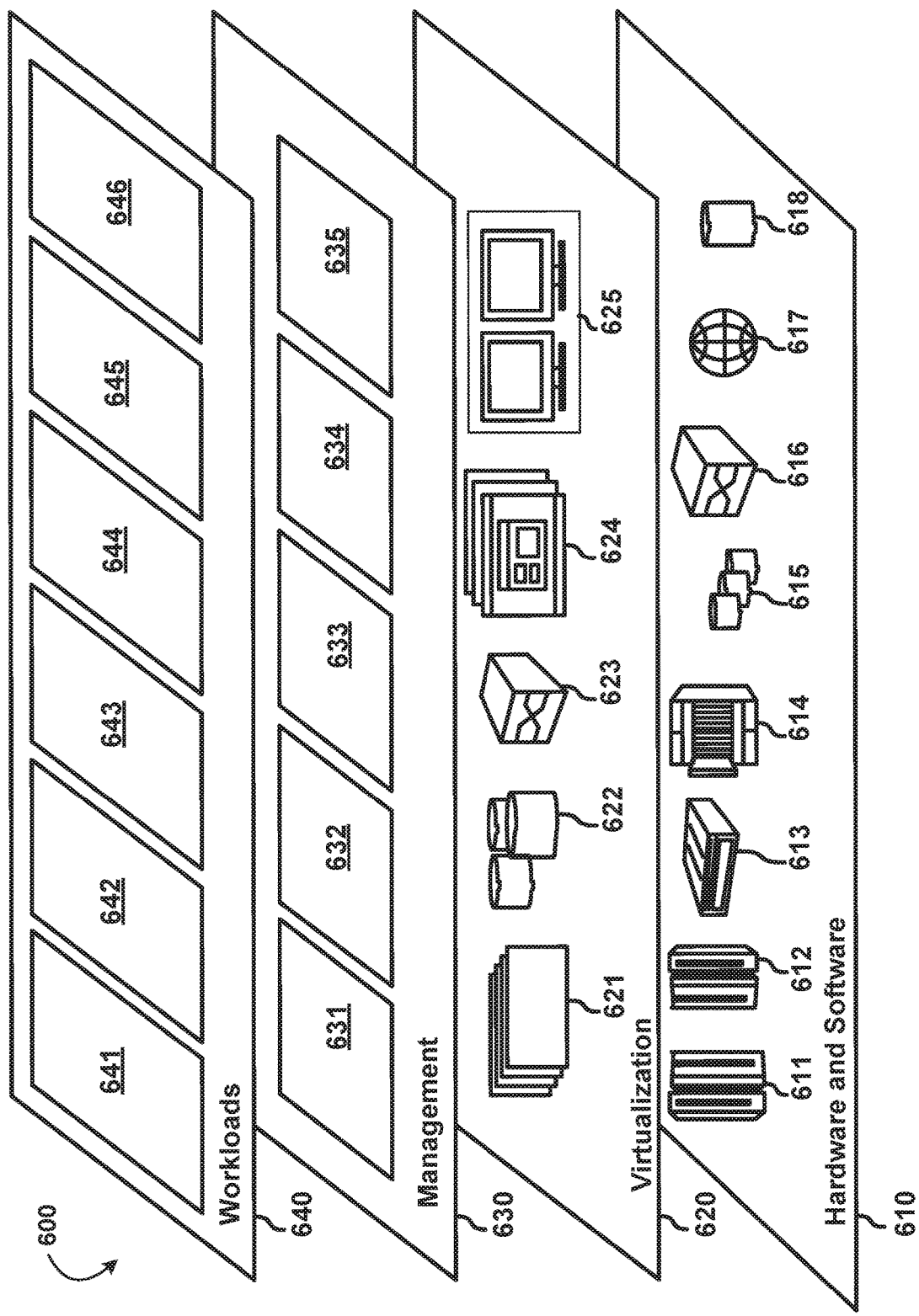
FIG. 6 is a block diagram illustrating a set of functional abstraction model layers provided by the cloud computing environment, according to some embodiments of the present disclosure.

FIG. 6 is a block diagram illustrating a set of functional abstraction model layers 600 provided by the cloud computing environment 500, according to some embodiments of the present disclosure. It should be understood in advance that the components, layers, and functions shown in FIG. 6 are intended to be illustrative only and embodiments of the invention are not limited thereto. As depicted, the following layers and corresponding functions are provided:

Hardware and software layer 610 includes hardware and software components. Examples of hardware components include: mainframes 611; RISC (Reduced Instruction Set Computer) architecture-based servers 612; servers 613; blade servers 614; storage devices 615; and networks and networking components 616. In some embodiments, software components include network application server software 617 and database software 618.

Virtualization layer 620 provides an abstraction layer from which the following examples of virtual entities may be provided: virtual servers 621; virtual storage 622; virtual networks 623, including virtual private networks; virtual applications and operating systems 624; and virtual clients 625.

In one example, management layer 630 provides the functions described below. Resource provisioning 631 provides dynamic procurement of computing resources and other resources that are utilized to perform tasks within the cloud computing environment. Metering and Pricing 632 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 633 provides access to the cloud computing environment for consumers and system administrators. Service level management 634 provides cloud computing resource allocation and management such that required service levels are met. Service Level Agreement (SLA) planning and fulfillment 635 provide pre-arrangement for, and procurement of, cloud computing resources for which a future requirement is anticipated in accordance with an SLA.

Workloads layer 640 provides examples of functionality for which the cloud computing environment can be utilized. Examples of workloads and functions that can be provided from this layer include: mapping and navigation 641; software development and lifecycle management 642; virtual classroom education delivery 643; data analytics processing 644; transaction processing 645; and determining causes of events in data sets 646.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for distributing workloads on a storage system, the method comprising:
    initializing a plurality of data components for a plurality of data types on a plurality of storage locations, wherein the locations are controlled by the storage system, wherein the data components include,
    a balancer, wherein the balancer includes write speeds of the data types on the storage locations,
    a previous write speed, wherein the previous write speed includes previously record write speeds of the data types on the storage locations, and
    a life cycle count, wherein the life cycle count is adjusted based on a preset time window;
    writing a plurality of data packages to the storage location for a predetermined time period based on the data components;
    creating a workload distribution plan for the storage system based on the data packages, wherein the workload distribution plan distributes a workload of the storage system to the storage locations; and
    implementing the workload distribution plan on the storage system.

2. The computer-implemented method of claim 1, wherein creating a workload distribution plan comprises:
    determining whether the balancer is equal to zero;
    setting the balancer to the previous write speed in response to the determination that the balancer is not equal to zero, and
    setting the life cycle count to a value of one; and
    determining whether the life cycle count is greater than the time window in response to the determination that the balancer is equal to zero.

3. The computer-implemented method of claim 2, wherein creating a workload distribution plan further comprises:
    setting the balancer equal to an average write speed of the data type on the storage location in response to the determination that the life cycle count is greater than the time window, and
    setting the life cycle count to zero; and
    determining whether the balancer is greater than a preset write speed in response to the determination that the life cycle count is not greater than the time window.

4. The computer-implemented method of claim 3, wherein creating a workload distribution plan further comprises:
    setting the balancer equal to the average write speed in response to the determination that the balancer is greater than the preset write speed, and
    setting the life cycle count to zero;
    increasing the life cycle count in response to the determination that the balancer is not greater than the preset write speed; and
    generating the workload distribution plan, wherein the workload distribution plan is based on a value of the balancer.

5. The computer-implemented method of claim 4, wherein generating the workload distribution plan comprises:
    allocating a percentage of the data types for an upcoming workload to the storage system to the storage locations.

6. The computer-implemented method of claim 5, wherein allocating a percentage of the data packages further comprises:
    creating the percentage based on an average of the balancer of the data types on the storage locations.

7. The computer-implemented method of claim 1, further comprising:
    evaluating the implementation of the workload distribution plan of the data types on the storage locations;
    calculating, based on the evaluation, values to create a new workload assignment for a next time period; and
    repeating the creating the workload distribution plan with the values calculated.

8. A computer-readable storage medium having instructions stored therein, which when executed by a computer, cause the computer to perform operations, the operations comprising:
    initializing a plurality of data components for a plurality of data types on a plurality of storage locations, wherein the locations are controlled by a storage system, wherein the data components include,
    a balancer, wherein the balancer includes write speeds of the data types on the storage locations,
    a previous write speed, wherein the previous write speed includes previously recorded write speeds of the data types on the storage locations, and
    a life cycle count, wherein the life cycle count is adjusted based on a preset time window;
    writing a plurality of data packages to the storage location for a predetermined time period based on the data components;
    creating a workload distribution plan for the storage system based on the data packages, wherein the workload distribution plan distributes a workload of the storage system to the storage locations; and
    implementing the workload distribution plan on the storage system.

9. The computer-readable storage medium of claim 8, wherein creating a workload distribution plan comprises:
    determining whether the balancer is equal to zero;

setting the balancer to the previous write speed in response to the determination that the balancer is not equal to zero, and setting the life cycle count to a value of one;

determining whether the life cycle count is greater than the time window in response to the determination that the balancer is equal to zero;

setting the balancer equal to an average write speed of the data type on the storage location in response to the determination that the life cycle count is greater than the time window, and setting the life cycle count to zero;

determining whether the balancer is greater than a preset write speed in response to the determination that the life cycle count is not greater than the time window;

setting the balancer equal to the average write speed in response to the determination that the balancer is greater than the preset write speed, and setting the life cycle count to zero;

increasing the life cycle count in response to the determination that the balancer is not greater than the preset write speed; and generating the workload distribution plan, wherein the workload distribution plan is based on a value of the balancer.

10. The computer-readable storage medium of claim 9, wherein generating the workload distribution plan comprises:

allocating a percentage of the data types for an upcoming workload to the storage system to the storage locations.

11. The computer-readable storage medium of claim 10, wherein allocating a percentage of the data packages further comprises:

creating the percentage based on an average of the balancer of the data types on the storage locations.

12. The computer-readable storage medium of claim 9, further comprising:

evaluating the implementation of the workload distribution plan of the data types on the storage locations;

calculating, based on the evaluation, values to create a new workload assignment for a next time period; and repeating the creating the workload distribution plan with the values calculated.

13. A system, comprising:

a processor;

a memory to store instruction, which when executed from the memory, cause the processor to perform operations on the system, initializing a plurality of data components for a plurality of data types on a plurality of storage locations, wherein the locations are controlled by a storage system, wherein the data components include, a balancer, wherein the balancer includes write speeds of the data types on the storage locations, a previous write speed, wherein the previous write speed includes previously recorded write speeds of the data types on the storage locations, and a life cycle count, wherein the life cycle count is adjusted based on a preset time window;

writing a plurality of data packages to the storage location for a predetermined time period based on the data components;

creating a workload distribution plan for the storage system based on the data packages, wherein the workload distribution plan distributes a workload of the storage system to the storage locations; and implementing the workload distribution plan on the storage system.

14. The system of claim 13, wherein creating a workload distribution plan comprises:

determining whether the balancer is equal to zero;

setting the balancer to the previous write speed in response to the determination that the balancer is not equal to zero, and setting the life cycle count to a value of one;

determining whether the life cycle count is greater than the time window in response to the determination that the balancer is equal to zero;

setting the balancer equal to an average write speed of the data type on the storage location in response to the determination that the life cycle count is greater than the time window, and setting the life cycle count to zero;

determining whether the balancer is greater than a preset write speed in response to the determination that the life cycle count is not greater than the time window;

setting the balancer equal to the average write speed in response to the determination that the balancer is greater than the preset write speed, and setting the life cycle count to zero;

increasing the life cycle count in response to the determination that the balancer is not greater than the preset write speed; and generating the workload distribution plan, wherein the workload distribution plan is based on a value of the balancer.

15. The system of claim 14, wherein generating the workload distribution plan comprises:

for each data type, allocating a percentage of the data types for an upcoming workload to the storage system to the storage locations.

16. The system of claim 15, wherein allocating a percentage of the data packages further comprises:

creating the percentage based on an average of the balancer of the data types on the storage locations.

17. The system of claim 13, further comprising:

evaluating the implementation of the workload distribution plan of the data types on the storage locations;

calculating, based on the evaluation, values to create a new workload assignment for a next time period; and repeating the creating the workload distribution plan with the values calculated.

* * * * *